Feb. 16, 1965 P. B. PHILLIPS ET AL 3,169,731
AIRCRAFT CONTROL LOCKING DEVICE
Filed March 18, 1963
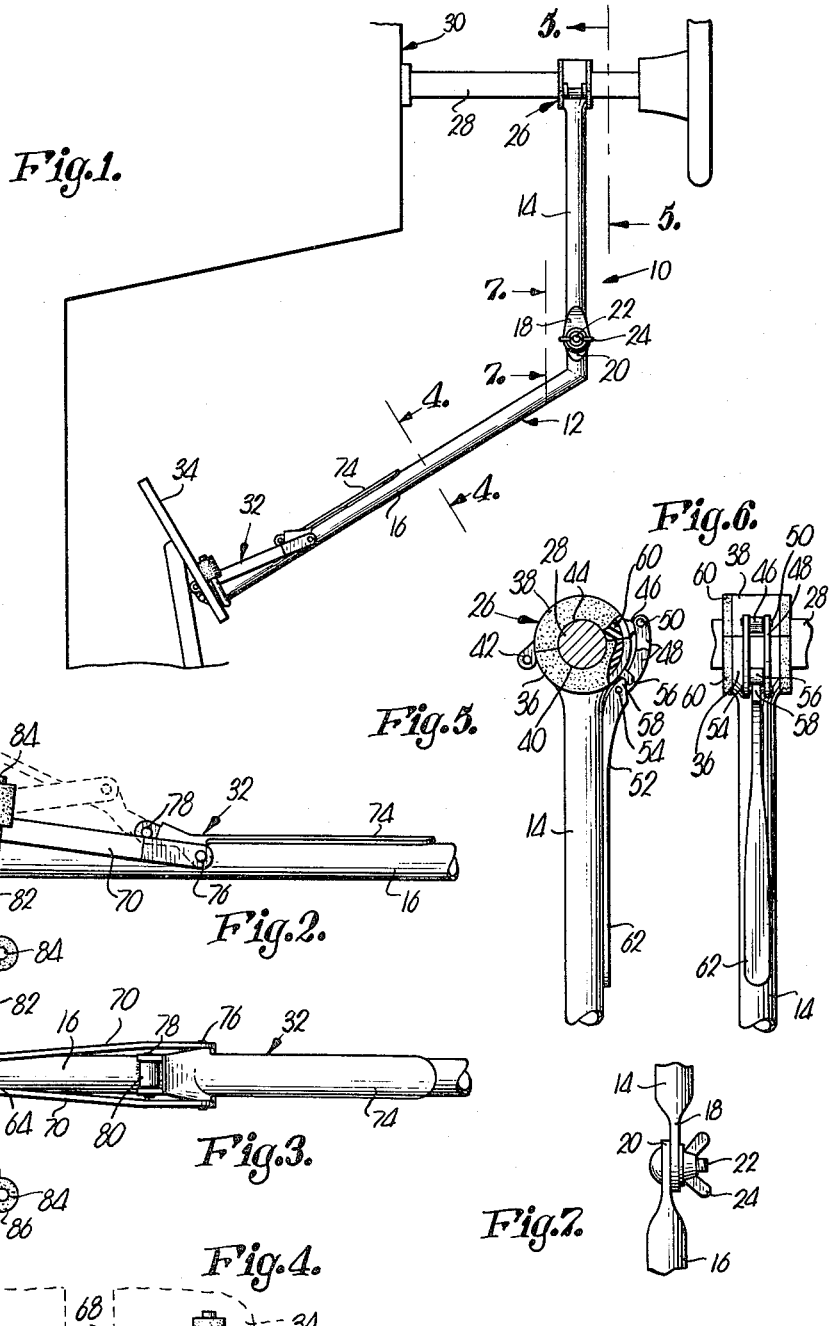
INVENTORS.
Paul B. Phillips
Byron R. Wilson
BY
Hovey, Schmidt, Johnson & Hovey
ATTORNEYS.

United States Patent Office 3,169,731
Patented Feb. 16, 1965

3,169,731
AIRCRAFT CONTROL LOCKING DEVICE
Paul B. Phillips, Meade, Kans., and Byron R. Wilson,
11851 W. 26th Ave., Denver, Colo.
Filed Mar. 18, 1963, Ser. No. 265,803
6 Claims. (Cl. 244—83)

This invention relates to locking structure for aircraft controls and has as its primary object the provision of means for rigidly and releasably interconnecting the shiftable control column and rudder pedals of an aircraft so as to preclude relative movement therebetween when the aircraft is in a parked or nonoperative position.

It is well known to provide means for preventing movement of the various control surfaces of an aircraft when the aircraft is in a parked position, such means taking the form of plates which connect the control surfaces to external, stationary parts of the aircraft. The purpose of these measures, of course, is to prevent the shifting of the control surfaces into positions which might give rise to large air forces on such surfaces due to winds when the aircraft is unattended.

Although this manner of securing aircraft control surfaces has proven satisfactory in a number of cases, the same, however, is not quite as satisfactory in other situations. For instance, the use of the aforesaid plates is inconvenient during inclement weather where the operator of the aircraft must manually affix the plates while being subjected to the extremes of the weather. Also, the use of such structure externally of the aircraft sometimes results in damage to the aircraft itself, either when the plates are being put on or taken off the surfaces. This is especially true if the aircraft is covered with a fabric.

The present invention circumvents the problems enumerated above by providing means which can be applied to the shiftable controls within the cabin of an aircraft so as to prevent relative movement between the controls and thereby preclude movements of the control surfaces relative to the remaining parts of the aircraft. To this end, the controls within the cabin may be releasably maintained in any one of a number of positions as desired, depending upon the attitude of the aircraft and the wind conditions about the same. By virtue of this construction, the operator may rigidly and releasably interconnect the manually actuated controls within the cabin immediately after parking the aircraft so as to assure that the control surfaces will not be moved until such time as the aircraft is made ready for subsequent use.

It is, therefore, another object of the present invention to provide locking structure for rigidly and releasably interconnecting the control column with the rudder pedals of an aircraft so that the control surfaces of the aircraft will be effectively locked in position without having to apply locking structures to the control surfaces externally of the aircraft as was heretofore required.

A further object of the present invention is the provision of locking structure of the aforesaid character which is utilized completely within the cabin of the aircraft rather than externally of the same and in contact with the control surfaces thereof so that no damage will result to the surfaces themselves by reason of their being maintained in fixed positions in view of the fact that no contact is made with the surfaces themselves.

A further object of the present invention is the provision of structure of the type described which may releasably and rigidly interconnect the control column with the rudder pedals of an aircraft in any one of a number of relative positions so that the control surfaces may be disposed in preselected positions as desired, depending upon the attitude of the aircraft and the wind conditions about the same.

Still another important object of the present invention is the provision of an elongated, rigid member having quick release means at each end thereof adapted to be secured to the control column and rudder pedals respectively, whereby the member may be readily secured to and removed from the control column and rudder pedals without requiring any special skill on the part of the user thereof.

In the drawing:

FIGURE 1 is a side elevational view of the locking structure of the present invention and illustrating the use thereof with the control column and a rudder pedal of a standard aircraft;

FIG. 2 is an enlarged, fragmentary view of the lower end of the locking structure illustrating the means thereon for releasably gripping the rudder pedals of the aircraft;

FIG. 3 is a top plan view of the structure illustrated in FIG. 2 and showing the same in a position gripping the pair of horizontally spaced rudder pedals;

FIG. 4 is a cross-sectional view taken along line 4—4 of FIG. 1;

FIG. 5 is a cross-sectional view taken along line 5—5 of FIG. 1 and illustrating the releasable clamping means at the opposite end of the structure;

FIG. 6 is a view similar to FIG. 5 but looking from right to left thereof; and

FIG. 7 is a fragmentary end view of the locking structure taken along line 7—7 of FIG. 1.

The present invention provides locking structure for releasably and rigidly interconnecting the control column and rudder pedals of a standard aircraft. Such structure includes an articulated, rigid member having a pair of pivotally interconnected sections and provided with means at the outer ends of the sections for releasably gripping the rudder pedals and for clamping about the control column, respectively. To this end, the lower section of the member is provided with projections which are disposed normally on opposed sides of the rudder pedals, one of the projections being movable toward and away from the other projection so as to alternately grip and release the pedals from between the projections.

The upper section is provided with relatively shiftable jaws and means for interconnecting the jaws when the same are disposed about the control column. By virtue of this construction the shifting movement of the control column and the swinging movement of the rudder pedals are prevented so as to effectively lock the control surfaces of the aircraft in preselected positions.

The locking structure forming the subject of the present invention is broadly denoted by the numeral 10 and includes an elongated member 12 having a pair of relatively shiftable sections 14 and 16. Proximal ends 18 and 20 of sections 14 and 16 are flattened, as shown in FIG. 7, and provided with openings therethrough for receiving a screw 22 to thereby interconnect sections 14 and 16. A wing nut 24 threaded on screw 22 releasably connects sections 14 and 16 so that section 16 may be disposed in any one of a number of angular positions relative to section 14.

Section 14 is provided with means 26 adapted to be releasably and rigidly secured to the control column 28 of an aircraft broadly denoted by the numeral 30. Section 16 is provided with means 32 for rigidly and releasably securing the same to the rudder pedals 34 of aircraft 30.

Means 26 includes a pair of jaws 36 and 38, jaw 36 being rigid to the normally uppermost end of section 14 and provided with a concave, column-engaging surface 40 as is clear in FIG. 5. A hinge 42 interconnects jaw 38 so that the concave, inner surface 44 thereof will mate with surface 40 when jaws 36 and 38 are in the positions shown in FIG. 5.

An ear 46 is rigid to and extends outwardly from jaw 38 as is clear in FIGS. 5 and 6. A pair of links 48 are pivotally secured adjacent proximal ends thereof to ear 46 by means of a pin 50. A lever 52 is pivotally secured to the opposite ends of links 48 by a pin 54. A projection or stop 56 is rigid to jaw 36 and extends laterally outwardly therefrom. Ear 46 and stop 56 are disposed on the same side of section 14 as is clear in FIG. 5 when surfaces 40 and 44 are in mating relationship. Lever 52 is provided with an outer end 58 which is engageable with one side of stop 56 when jaws 36 and 38 are disposed in the manner shown in FIG. 5. Jaws 36 and 38 are transversely U-shaped and carry therewithin semi-circular gaskets 60 which bear against column 28 when jaws 36 and 38 surround the latter. Lever 52 is provided with a handle portion 62 which conforms to the outer surface of section 14.

Means 32 includes an elongated shaft-like element 64 having a transverse projection or pin 66 rigid thereto and extending laterally therefrom in opposed directions as is clear in FIG. 3. Section 16 is tubular and telescopically receives element 64 for axial movement.

An extension 68 is secured to and extends outwardly from element 64 as is clear in FIGS. 2 and 3. A pair of links 70 are pivotally secured by a pin 72 to extension 68, links 70 extending axially of section 16 as is clear in FIG. 3. The opposite ends of links 70 are secured to a handle 74 intermediate the extremities thereof by means 76. Handle 74 is pivotally secured by means of a pin 78 to an extension 80 rigid to and extending outwardly from section 16 as is clear in FIG. 3. The major portion of handle 74 is arcuate to conform to the outer surface of section 16 as is clear in FIGS. 2 and 3.

A U-shaped, rod-like component 82 is secured at the bight thereof to section 16 as is clear in FIG. 4. Component 82 is provided with a pair of parallel projections or legs 84, each having a cylindrical, resilient bearing element 86 thereon adjacent the outer end thereof. As shown in FIG. 2, legs 84 are slightly inclined relative to a plane normal to the longitudinal axis of section 16. This construction will compensate for slight variations in the angularity of pedals 34 relative to the horizontal.

In operation, structure 10 is utilized for rigidity interconnecting column 28 with pedals 34 when the aircraft 30 is in a parked or non-operative position. Initially, wing nut 24 is manipulated so as to permit relative movement between sections 14 and 16. Immediately thereafter section 14 is moved so that column 28 is disposed within jaw 36 and in engagement with surface 40 thereof. In this position, jaw 38 will be swung away from a position overlying jaw 36, and lever 52, of course, will be remote from jaw 36.

Lever 52 is then shifted so as to shift jaw 38 into the position shown in FIG. 5 and end 58 of lever 52 is moved to a position beneath stop 56. Further swinging movement of lever 52 toward section 14 will releasably lock jaw 38 about the proximal portion of column 28.

Handle 74 is then shifted to the dashed line position shown in FIG. 2 so that pin 66 will be disposed to permit pedals 34 to be situated between pin 66 and component 82. By swinging handle 74 in a clockwise sense when viewing FIG. 2, pin 66 will be drawn toward component 82 and into engagement with one side of each of the rudder pedals 34. It is noted that bearing elements 86 will be held in engagement with the opposite sides of pedals 34 until pin 66 engages the proximal sides of such pedals. When the outer ends of sections 14 and 16 are secured to column 28 and pedals 34, respectively, wing nut 24 is then manipulated to rigidly interconnect sections 14 and 16. Any tendency thereafter for column 28 to reciprocate horizontally will be resisted by section 14 in view of the fact that the same, in effect, is rigid to pedals 34.

Since pedals 34 are pivotal only about horizontal axes normal to the path of movement of column 28, it is clear that, so long as structure 10 rigidly interconnects column 28 with pedals 34, there will be no movement of column 28 relative to pedals 34 and thereby relative to aircraft 30. The control surfaces coupled with column 28 will, therefore, be rendered immovable. Similarly, any tendency for pedals 34 to be shifted about their respective axes will be resisted by section 16 since the latter is, in effect, coupled rigidly with column 28.

In removing structure 10 from the locking relationship shown in FIG. 1, handle 74 may be manipulated to the dashed line position of FIG. 2 so as to shift pin 66 away from pedals 34. Thereafter, lever 52 will be swung in a counterclockwise sense when viewing FIG. 5 so as to shift jaw 38 away from a position overlying column 28. It is noted that wing nut 24 need not be manipulated when removing structure 10 from the position shown in FIG. 1.

Having thus described the invention, what is claimed as new and desired to be secured by Letters Patent is:

1. Structure for locking the shiftable control column of an aircraft with the rudder pedal thereof, said structure including:
    an elongated, rigid member normally adapted for spanning the distance between the control column and the pedal;
    means carried by said member at one end thereof for releasably gripping said pedal, and including a pair of pedal-engaging projections adapted to be disposed on opposed sides of the pedal, and means mounting one of said projections for movement relative to the other projection toward and away from a fixed, pedal-engaging position; and
    means on the member at the opposite end thereof for clamping said member to said control column, whereby said pedal and said control column are rigidly interconnected.

2. Structure for locking the shiftable, horizontally disposed control column of an aircraft with the shiftable, horizontally spaced rudder pedals thereof, said structure including:
    an elongated member normally adapted for spanning the distance between the control column and the rudder pedals and provided with a pair of rigid sections;
    means releasably interconnecting said sections at proximal ends of the latter, the lower section being tubular;
    an elongated element telescopically received within said one section and normally projecting outwardly therefrom;
    a transverse pin secured to the outer end of said element and extending laterally therefrom in opposed directions, said pin being adapted for engaging the proximal sides of said rudder pedals;
    an elongated component secured to said one section and extending laterally therefrom in opposed directions, said component being adapted for engaging the opposite sides of said rudder pedals;
    a handle swingably secured at one extremity thereof to said one section;
    a link pivotally secured at one end thereof to said element and at the opposite end thereof to said handle intermediate the extremities thereof, said link being disposed for moving said pin toward and away from said component to thereby alternately grip and release the rudder pedals;
    a pair of relatively shiftable jaws carried by the other section adjacent the upper end of the latter, said jaws being adapted for at least partially surrounding said control column; and
    means for releasably interconnecting said jaws when the same surround the control column, whereby the rudder pedals are releasably and rigidly interconnected with said control column to preclude relative movement therebetween.

3. Structure for locking the shiftable control column of an aircraft with the rudder pedal thereof, said structure including:
- an elongated, rigid member normally adapted for spanning the distance between the control column and the pedal, said member having a pair of opposed ends, one of said ends being tubular;
- means carried by said member at said one end thereof for releasably gripping the pedal, and including a first pedal-engaging projection secured to the member and an elongated element telescopically received within said one end, said element having a second pedal-engaging projection thereon movable toward and away from said first projection into and out of a pedal-engaging position as said element shifts relative to said member, and means for shifting the element relative to the member; and
- means on the member at the opposite end thereof for clamping said member to said control column, whereby said pedal and said control column are rigidly interconnected.

4. Structure as set forth in claim 3, wherein said element-shifting means includes a link pivotally secured at one end thereof to said element and a handle swingably secured at one extremity thereof to said member, said link being pivotally secured to the handle intermediate the extremities thereof.

5. Structure as set forth in claim 4, wherein said link is disposed with the longitudinal axis thereof on one side of said one extremity of said handle when said second projection is in said pedal-engaging position, said link being shiftable to the other side of said one extremity when said second projection is moved out of said pedal-engaging position.

6. Structure for locking the shiftable control column of an aircraft with the rudder pedal thereof, said structure including:
- an elongated, rigid member normally adapted for spanning the distance between the control column and the pedal;
- means carried by said member at one end thereof for releasably gripping said pedal; and
- means on the member at the opposite end thereof for clamping said member to said control column, said clamping means including a pair of relatively shiftable jaws adapted to be disposed in locations about said control column, one of said jaws being rigid to the member at said opposite end and being provided with a stop, the other of said jaws being pivotally secured to the member, a lever, and a link pivotally connected at one end thereof to said other jaw and at the opposite end thereof to said lever and mounting the latter for movement to a position engaging one side of said stop, with said one end of the link on the opposite side of the stop, to draw said jaws toward one another to thereby maintain said control column against movement when the jaws are in said locations, whereby said pedal and said control column are rigidly interconnected.

References Cited in the file of this patent

FOREIGN PATENTS 519,519     Great Britain _____ June 23, 1939